L. J. KNITTEL.
DINNER PAIL.
APPLICATION FILED JUNE 21, 1912.

1,058,601.

Patented Apr. 8, 1913.
2 SHEETS—SHEET 1.

Witnesses

Inventor
LAWRENCE J. KNITTEL,
By Victor J. Evans
Attorney

L. J. KNITTEL.
DINNER PAIL.
APPLICATION FILED JUNE 21, 1912.

1,058,601.

Patented Apr. 8, 1913.

2 SHEETS—SHEET 2.

Witnesses

Inventor
LAWRENCE J. KNITTEL,
By Victor J. Evans
Attorney

UNITED STATES PATENT OFFICE.

LAWRENCE J. KNITTEL, OF LYONS, NEW YORK.

DINNER-PAIL.

1,058,601.  Specification of Letters Patent.  Patented Apr. 8, 1913.

Application filed June 21, 1912. Serial No. 705,050.

*To all whom it may concern:*

Be it known that I, LAWRENCE J. KNITTEL, a citizen of the United States, residing at Lyons, in the county of Wayne and State of New York, have invented new and useful Improvements in Dinner-Pails, of which the following is a specification.

This invention relates to dinner pails, and it has for its object to provide a combined dinner pail and heater of simple and improved construction whereby the contents of the pail may be quickly heated.

A further object of the invention is to construct a device with a receptacle or tank for coffee or other liquids, the said tank constituting a portion of the receptacle in which solid food is kept.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
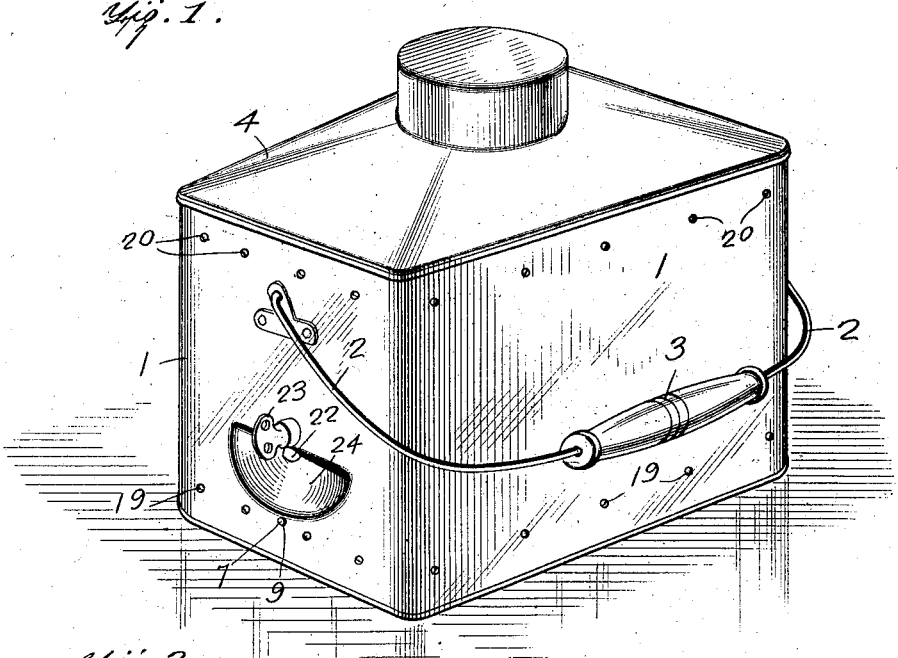
Figure 3:
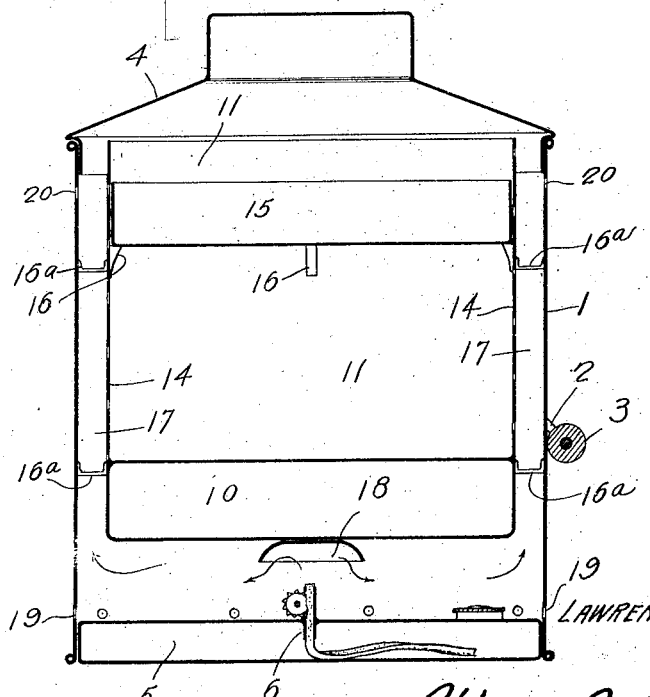
Figure 2:
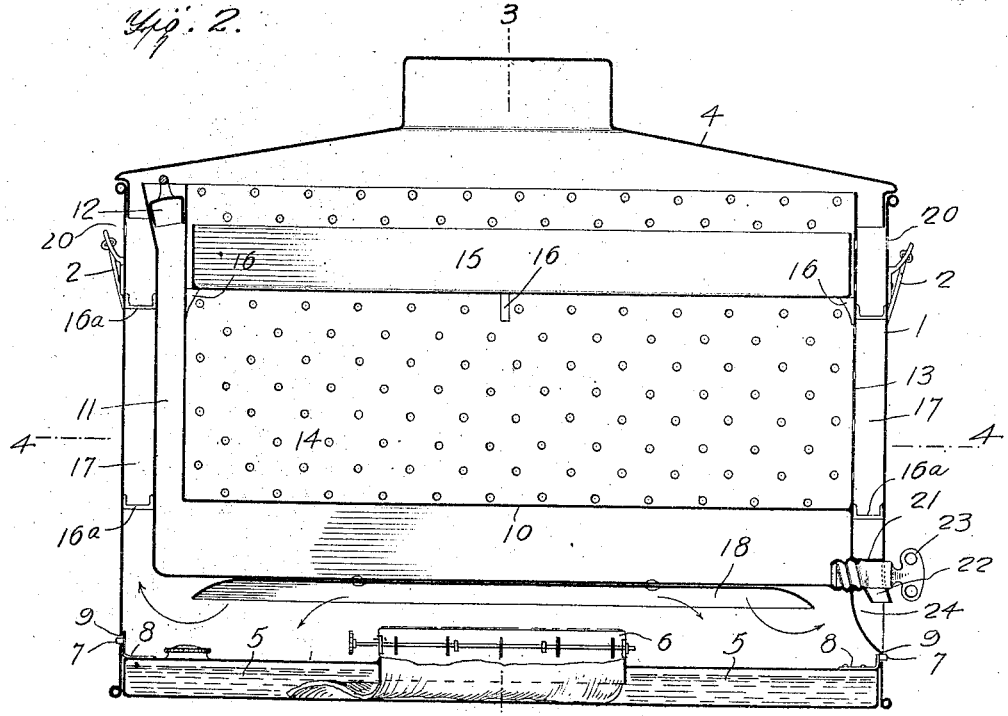
Figure 4:
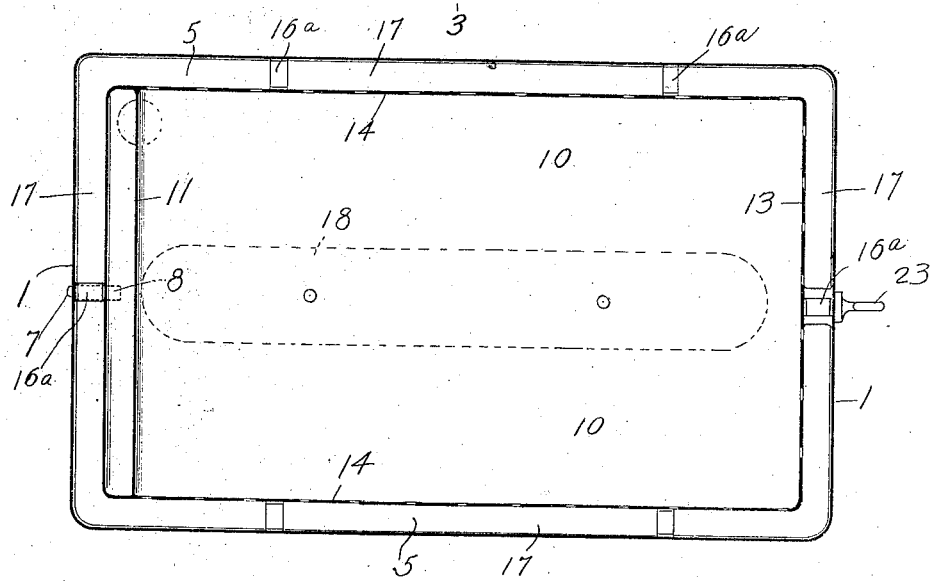

In the drawings,—Figure 1 is a perspective view of a dinner pail constructed in accordance with the invention. Fig. 2 is a longitudinal vertical sectional view of the same. Fig. 3 is a vertical transverse sectional view taken on the line 3—3 in Fig. 2. Fig. 4 is a horizontal sectional view taken on the line 4—4 in Fig. 2.

Corresponding parts in the several figures are denoted by like characters of reference.

The outer wall 1 of the improved device is of tubular form and preferably of rectangular plan, although no limitation is made to the particular shape. This tubular wall member is provided with a bail 2 having a handle 3 whereby it may be conveniently carried, and it is also provided with a snugly fitting lid 4. Fitted in the lower portion of the tubular wall is a heater comprising a tank or receptacle 5 for oil or other combustible liquid, said tank being provided with a wick tube 6. A specially constructed burner may also be provided, but as such an element is well known, it is not considered necessary to show or to particularly describe the same. The heater tank 5 is provided with spring lips or members 8 having studs 7 projecting through apertures 9 in the wall 1, the same constituting connecting means whereby the heater tank may be conveniently connected with or detached from the outer wall or casing for the purpose of filling or lighting.

Supported within the outer wall or casing is a food receptacle comprising a flat L-shaped tank 10, the upstanding portion of which 11 is provided with a filling plug 12. Said upstanding portion of the tank may form one end wall of a receptacle, the other end wall of which, 13, as well as the side walls 14 are formed preferably of foraminous sheet metal which may be soldered or otherwise secured to the tank, thus producing an oblong receptacle above the tank in which a detachable tray 15 may be supported on suitable brackets 16, thus dividing the receptacle into compartments for the reception of various kinds of solid food, including cakes, pastry and the like. The receptacle composed of the tank 10 with its upstanding portion 11 and the end and side walls 13, 14 may be supported either permanently or detachably within the outer casing or wall 1 by means of suitable brackets or connecting members 16ª, a suitable space 17 being left between the walls of the inner receptacle and the outer wall or casing. Secured upon the underside of the tank 10 is a flame spreader 18 which will serve to deflect the heat and the products of combustion from the heater in the direction of the space 17. The outer wall or casing is provided near its lower and upper ends with apertures 19, 20 which serve, respectively, for the admission of air to support combustion and for the escape of the products of combustion.

The tank 10 is provided with a nozzle 21 extending through the outer wall or casing and having a discharge spout 22 which is capable of being obstructed by means of a suitable key or valve 23. The wall or casing 1 is offset inwardly to produce a recess 24 of ample size to accommodate the discharge spout 22 and to permit a cup or vessel to be conveniently presented to receive the liquid discharged through the spout.

The upstanding or vertical portion or limb of the L-shaped tank 10 is not necessarily of a width to constitute one end wall of the receptacle. Said upstanding or vertical portion may simply constitute a filling tube, as will be readily understood, and no limitation is made or intended in this respect.

From the foregoing description, taken in connection with the drawings hereto annexed, the operation and advantages of this invention will be readily understood. The compartment wherein solid food is carried and which is bounded at one end by the vertical leg of the liquid container or tank and at the sides and the other end by foraminous walls is heated when the temperature of the contents of the tank is raised by radiation not only from the bottom of the compartment, but also from that end wall which constitutes the vertical leg of the container. The remaining end and sides being foraminous and in communication with the space 16 in which, when the heater is lighted, there is an upward draft, will be ventilated, and vapor will be freely carried off instead of condensing and rendering the contents of the compartment soggy and unpalatable. At the same time, owing to the upward draft in the space 17, there is no danger of the contents of the food compartment being contaminated by the products of combustion. The space 17, moreover, which envelops the sides and the ends of the food compartment, constitutes, when the heater is lighted, a heating chamber which materially assists in heating the contents of the food compartment.

The construction of the improved dinner pail is simple and inexpensive, and it affords convenient means to enable the working man to carry his dinner and enable the same to be properly heated with very little trouble and practically no attention by simply igniting the heater shortly before the noon hour.

Having thus described the invention, what is claimed as new, is:—

1. In a device of the character described, a wall constituting an outer casing, and a receptacle supported therein, said receptacle comprising a tank closed at the top, and foraminous side and end wall members associated therewith and combining with said tank to form a compartment, the wall members of said compartment being spaced from the outer wall to form a space surrounding the compartment for the passage of products of combustion, said outer wall being provided with openings for the admission of air and for the exit of products of combustion, and a heater supported detachably in the lower part of the outer casing.

2. In a device of the character described, a wall constituting an outer casing, said wall having openings for the inlet of air and for the exit of products of combustion, a heater supported detachably in the lower part thereof, a receptacle supported in the outer casing above the heater, said receptacle comprising an L-shaped tank, closed at the top, and perforated side and end walls connected therewith and combining with said tank to form a compartment, said receptacle being spaced from the outer wall and said tank being provided with a valved nozzle projecting through the outer wall and having a discharge spout; said casing being offset inwardly to form a recess to accommodate the discharge spout.

3. In a device of the character described, a wall constituting an outer casing, a heater supported in the lower part thereof, an L-shaped liquid container, closed at the top, supported above the heater and having a discharge nozzle extending through the outer wall, and perforated end and side walls associated with the L-shaped tank and combining therewith to form a compartment, said outer wall having openings for the admission of air and for the exit of products of combustion.

In testimony whereof I affix my signature in presence of two witnesses.

LAWRENCE J. KNITTEL.

Witnesses:
LUTHER S. LAKE,
I. M. VANDERBILT.

---

Copies of this patent may be obtained for five cents each, by addressing the "Commissioner of Patents Washington, D. C."